United States Patent
Schuh et al.

(10) Patent No.: US 6,609,076 B2
(45) Date of Patent: Aug. 19, 2003

(54) INTERFACE DEVICE AND METHOD OF USE WITH A SMART SENSOR

(75) Inventors: William C. Schuh, Delavan, WI (US); Ronald H. Amundson, St. Charles, MN (US)

(73) Assignee: Claud S. Gordon Company, Richmond, IL (US)

( * ) Notice: Subject to any disclaimer, the term of this patent is extended or adjusted under 35 U.S.C. 154(b) by 26 days.

(21) Appl. No.: 09/966,034

(22) Filed: Sep. 28, 2001

(65) Prior Publication Data

US 2003/0065467 A1 Apr. 3, 2003

(51) Int. Cl.⁷ .................. G01D 18/00; G01K 15/00
(52) U.S. Cl. .................. 702/99; 702/104; 702/122
(58) Field of Search .................. 702/85, 99, 104, 702/182, 183, 122; 374/172, 179, 183; 73/1.01, 117.2

(56) References Cited

U.S. PATENT DOCUMENTS

| | | | |
|---|---|---|---|
| 5,005,142 A | * | 4/1991 | Lipchak et al. ............. 702/183 |
| 5,820,262 A | | 10/1998 | Lechner |
| 5,857,777 A | * | 1/1999 | Schuh ........................ 374/172 |
| 5,887,978 A | | 3/1999 | Lunghofer et al. |
| 6,032,109 A | * | 2/2000 | Ritmiller, III ............... 702/104 |
| 6,045,260 A | | 4/2000 | Schwartz et al. |

* cited by examiner

*Primary Examiner*—Bryan Bui
(74) *Attorney, Agent, or Firm*—Renner, Otto, Boisselle & Sklar, LLP

(57) ABSTRACT

A smart temperature sensing system and method for improved performance of smart temperature sensors when used in conjunction with an indicating instrument. This sensing system uses a microprocessor-based interface to send a signal to the indicating instrument via an existing communications port. The sent signal may consist of a calibration offset value to correct the indicated temperature in the instrument. This offset value is determined from data resident within a memory device in the temperature sensor.

28 Claims, 3 Drawing Sheets

INTERFACE DEVICE AND METHOD OF USE WITH A SMART SENSOR

FIELD OF THE INVENTION

The present invention relates generally to a measurement system including a smart sensor having data uniquely characterizing the sensor stored in a memory local to the sensor, and more particularly to a measurement system including a communications interface for use with a smart sensor.

BACKGROUND OF THE INVENTION

Many applications require accurate information about a property of a given environment, such as temperature, pressure, relative humidity, etc. A sensor in contact with an environment to be sensed, for example, can convey an electrical signal indicative of the temperature, e.g., in the environment to an indicating instrument. The indicating instrument converts the electrical signal into a temperature value for display or other output indicative of that temperature. Unfortunately, however, some temperature sensors do not provide acceptably accurate temperature readings because the sensors and/or the instruments are not adequately calibrated for use with one another.

Each sensor has unique operating characteristics that the indicating instrument must take into account to provide an accurate interpretation of the signal from the sensor. Smart sensors store this data in a memory local to the sensor. The smart sensor is connected to an input/output communications port in the indicating instrument. The communications port allows the indicating instrument to send and receive data and instructions, such as requesting the characterizing data from the sensor's memory, receiving calibration settings or outputting data, such as a temperature reading. The indicating instrument can thus be connected to an input or output device other than the smart sensor through the communications port, including a printer, a computer, a display, a keyboard, a mouse, etc. When the smart sensor is connected to the communications port, the sensor can communicate an analog signal indicative of the temperature and can communicate digitally between the indicating instrument and the memory of the smart sensor. The indicating instrument then analyzes the analog signal from the smart sensor in view of the characterizing data and outputs a value more accurately representative of the temperature.

The smart sensor and the indicating instrument generally have a predetermined relationship for communicating the characterizing data from the sensor to the instrument. The characterizing data is used by the instrument to adjust the calculated temperature value to provide a more accurate temperature reading. In a number of applications no predetermined relationship exists, particularly when the sensor manufacturer is not the instrument manufacturer. For example, the characterizing data may be in a different format (columns instead of rows, for example), have different data (such as the sensor manufacturer's serial number) and/or may incorporate offset functions that may or may not be expected to be compensated for by the manufacturer of the indicating instrument. Consequently, some sensors are incompatible with certain indicating instruments.

Additionally, sensors generally degrade over time and must be replaced periodically, particularly when the sensor is used in a harsh environment. In contrast, indicating instruments generally last for a relatively long time. Since the indicating instrument usually is much more expensive than the sensor, it is desirable to replace the sensor while continuing to use the indicating instrument. Because the replacement sensor must be compatible with the indicating instrument for accurate operation, the indicating instrument manufacturer generally also must be the manufacturer of the selected replacement sensor. Unfortunately, that manufacturer may not offer the best performing or most attractively priced sensor for a given application.

SUMMARY OF THE INVENTION

The present invention provides a sensing system that includes a smart sensor, an indicating instrument, and a smart interface device in communication with the smart sensor and the indicating instrument. The interface device advantageously allows a smart sensor to be used with any indicating instrument. The interface device can be preprogrammed to receive data characterizing the sensor, to develop calibration data based on the characterizing data, and to communicate the calibration data to the indicating instrument. The indicating instrument uses the calibration data to output a more accurate temperature reading. In effect, the interface device acts as a translator between the smart sensor and the indicating instrument. Thus a purchaser of a replacement smart sensor is not limited by the manufacturer of the indicating instrument with which it will be used.

More specifically, the present invention includes a system for providing an indication of an environmental property, such as temperature. Such a system includes an indicating instrument, a smart sensor and a programmable interface device. The smart sensor includes a sensor unit operable to sense the environmental property and a local memory unit with characterizing data stored therein. The sensor unit may be a temperature sensor, such as a resistance temperature device or a thermocouple. The characterizing data in the memory unit includes data characterizing the operation of the sensor unit.

The memory unit of the smart sensor is connected to the interface device by a first communication link, such as a wire, for communicating the characterizing data to the interface device. The sensor unit of the smart sensor is connected to the indicating instrument either directly or via the interface device by a second communication link for communicating to the indicating instrument a signal indicative of a sensed property. The indicating instrument is connected to the interface device by a third communications link for communicating to the interface device an estimated property value determined from the sensed property signal.

The interface device includes means for determining calibration data based on the characterizing data, including means for determining the calibration data based on the characterizing data and the estimated property value. The means for determining the calibration data may include a processor and a memory unit. The memory unit of the interface device may have software instructions for communicating with the smart sensor and the indicating instrument, or for determining the calibration data, such as a calibration offset. The memory unit may be in the form of an electrically erasable programmable read-only memory.

The indicating instrument includes means for determining indicated property data. The indicating instrument may include a processor. The indicating instrument processor determines the sensed property value based on the sensed property signal from the sensor unit. The indicating instrument processor also determines the indicated property data based on the estimated property value and the calibration data. In particular, the indicating instrument processor may be operable to determine the indicated property data by adding a calibration offset to the estimated property value.

The present invention also includes a method comprising the steps of (a) connecting an interface device between a smart sensor and an indicating instrument; (b) transmitting a sensed property signal from the smart sensor to the indicating instrument; (c) determining an estimated property value based on the sensed property signal; (d) transmitting the estimated property value to the interface device; transmitting characterizing data to the interface device including data characterizing the operation of the smart sensor; (e) determining calibration data from the estimated property value and the characterizing data; and (f) determining an indicated property value based on the estimated property value and the calibration data. The method may further include the steps of transmitting sensed property data from a sensor unit of the smart sensor to the indicating instrument, determining a calibration offset, and algebraically adding the calibration offset to the estimated property value and displaying the indicated property value.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
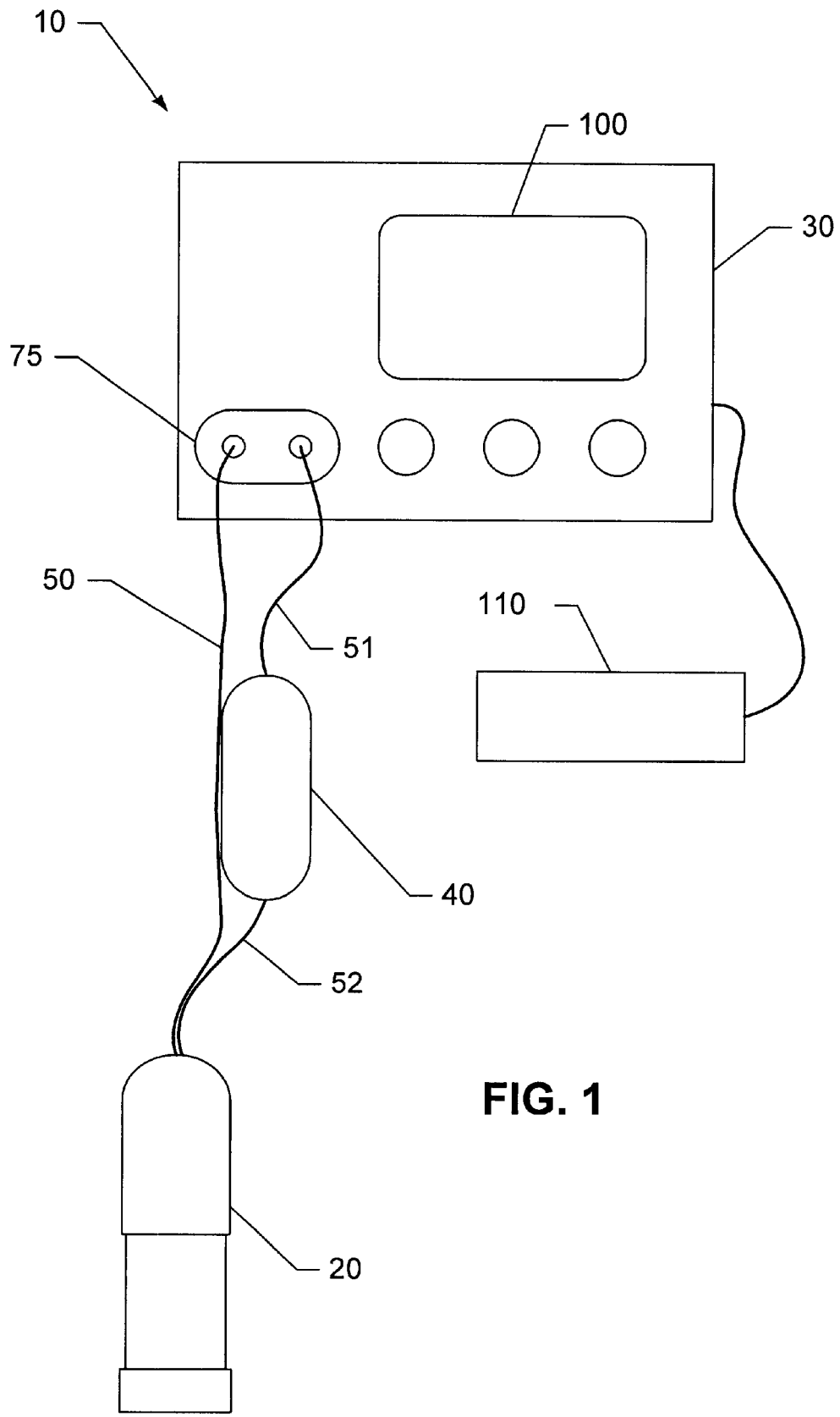
FIG. 1 is a schematic view of a system according to the present invention.
Figure 2:
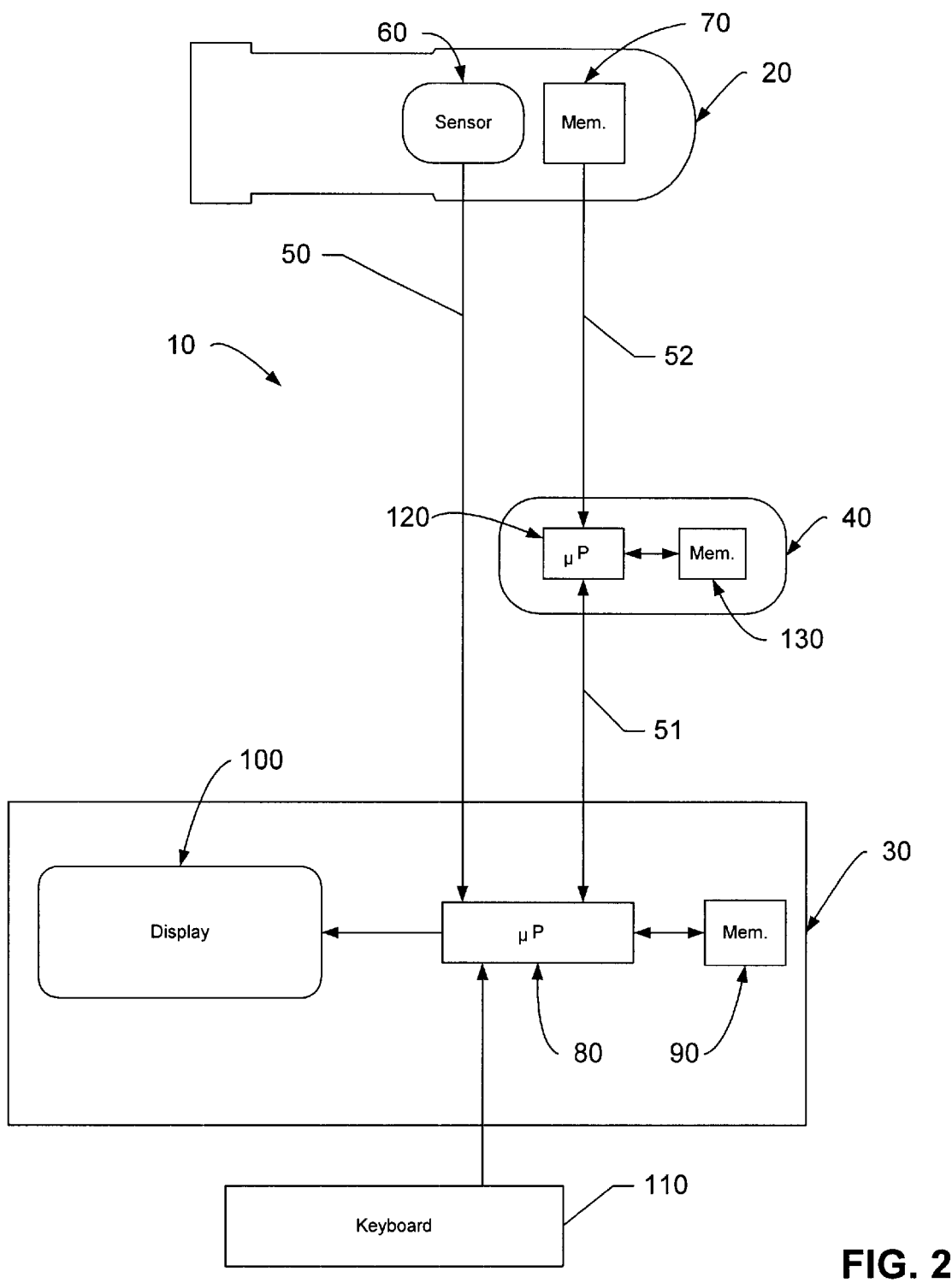
FIG. 2 is a schematic view of the system of FIG. 1 further illustrating internal components of each element.

Referring initially to FIGS. 1 and 2, the present invention provides a system 10 that includes a smart sensor 20, an indicating instrument 30, and a smart interface device 40. The smart sensor 20 senses the temperature of a given environment and communicates the sensed temperature signal to the indicating instrument via a first communication link 50. The indicating instrument converts the sensed temperature signal into an estimated temperature, and communicates the estimated temperature to the smart interface device over a second communication link 51. The interface device also receives data characterizing the smart sensor via a third communication link 52. The interface device then uses the estimated temperature and the characterizing data to determine calibration data. The interface device communicates the calibration data back over the second communication link to the indicating instrument. The indicating instrument uses the calibration data to determine and to output an indicated temperature.

The communication links between the smart sensor 20, the interface device 40 and the indicating instrument 30 may be effected by wires or transmitters and receivers for infrared, radio or other electromagnetic signals. Clearly, at least the second communication link 51 is bidirectional.

Most temperature sensing systems have a means for adjusting or fine-tuning the measured temperature, such as by adjusting the estimated temperature by a scalar amount. It should be noted, however, that the signal produced by a temperature sensor may be nonlinear over a range of operating temperatures. Consequently, it is important to know the characteristics of each particular sensor to accurately the estimated temperature. This adjustment usually is referred to as the calibration offset and is meant to accommodate situations where a difference is known to exist between the temperature indicated by the sensor and the actual temperature of the environment. For instance, a sensor may be calibrated against a known reference standard to measure the variance in output from published specifications for a particular group of sensors. The variance from the standard then becomes the calibration offset for this sensor. The estimated temperature is adjusted by adding or subtracting the calibration offset. In an exemplary embodiment of the system 10 provided by the present invention, the calibration offset is determined automatically by the interface device 40 from the characterizing data and the estimated temperature.

Turning to each element of the sensing system 10 in detail, the smart temperature sensor 20 includes a sensor unit 60 for sensing the temperature of an environment with which it is in contact, directly or indirectly, and a memory unit or device 70 programmable to include data characteristic of the smart sensor. The sensor unit may include a thermistor, a thermocouple or a resistance temperature device (RTD), for example. The memory unit may be an electronic data storage device, including an erasable programmable read-only memory (EPROM) or an electrically erasable programmable read-only memory (EEPROM).

Each sensor unit 60 has operating characteristics that are unique to that sensor. The memory unit 70 is programmed by the sensor manufacturer with data that characterizes the smart sensor 20 and the sensor unit. This data might consist of a table of offset values at various temperatures, or a set of coefficients to a characterizing function for the offsets at various temperatures. The memory unit may include additional characterizing data, such as a time constant for the speed of the sensor's response, intended use data for sensor drift, the time and/or date the sensor was calibrated, an expected rate of sensor degradation, etc. The memory unit also may be programmed to include additional information not directly used to measure the temperature, including the name and address of the manufacturer, a model number, a serial number, maintenance data, etc. An exemplary smart temperature sensor is shown and described in commonly owned U.S. Pat. No. 5,857,777, the entire disclosure of which is hereby incorporated herein by reference.

The signal indicative of the sensed temperature is transmitted to the indicating instrument 30 via the first communication line 50. The illustrated indicating instrument 30 has a communications port 75 for connecting the first and second communication links 50, 51 to the indicating instrument 30. In the case of a thermocouple sensor unit 60, the two wire output forms the first communication link 50, and the wires are connected to the communications port of the indicating instrument. The sensed temperature signal generally is an analog signal, and the indicating instrument converts the analog signal into a digital signal for analysis. The indicating instrument 30 also includes a processor 80 and a memory unit 90. The processor 80 converts the sensed temperature signal (expressed in electrical units, such as voltage) into an estimated temperature (expressed in units of temperature, such as degrees Celsius). The indicating instrument 30 also includes or is connected to one or more output devices 100, such as a display, and/or one or more input devices 110, such as a keyboard. Additional functionality may be achieved by altering the software architecture resident in the indicating instrument. An exemplary indicating instrument is disclosed in the aforementioned U.S. Pat. No. 5,857,777, referred to therein as a field signal acquisition unit (FSAU).

Another exemplary indicating instrument 30 includes the Watlow 988 controller with a serial communications port, available from Watlow Controls of Winona, Minn. The indicating instrument includes means for adjusting its calibration offset, preferably digitally and more preferably this means uses one of a recognized standard for communication links, such as RS-485. The user can set up the indicating instrument for various inputs, outputs, control schemes, ranges, communication settings, engineering units, etc. The indicating instrument 30 may be configured via a keypad or for convenience via the communications port 75 to alter any of the setup parameters. The calibration offset may be set by sending a command to the indicating instrument 30 from the interface device 40, for example, over the second communication link 51.

Indicating instruments generally attempt to retrieve the characterizing data directly from the memory unit 70 of the smart sensor 20. Unfortunately, indicating instruments produced by different manufacturers may assume that different information is present in the characterizing data received from the smart sensor and/or may assume that such data is being presented in a particular format. Consequently, a smart sensor from a particular manufacturer may or may not be operable with an indicating instrument from another manufacturer. Thus, prior to the present invention the selection of a replacement smart sensor has been limited to smart sensors that are operable with an indicating instrument from a particular manufacturer. The smart interface device 40 provided by the present invention allows smart sensors to be operable with otherwise incompatible indicating instruments.

The smart interface device 40 is programmed to retrieve and to translate, as necessary, the characterizing data from the smart sensor 20 into calibration data for use by the indicating instrument 30. As used herein, the term "calibration data" includes characterizing data that has been recharacterized. Recharacterizing includes any change in how the data would appear to the indicating instrument 30 receiving the data from the interface device, whether it includes a change in the format and/or a change in the data values. As used herein, the term "calibration" does not necessarily require calculation, i.e., the data values do not have to change. For example, some indicating instruments may be compatible with certain smart sensors because the indicating instrument expects the data to be arranged in a table by column when the sensor manufacturer actually programmed the characterizing data into the memory of the sensor serially, comma delimited. In that case, the calibration data may differ from the characterizing data only in the arrangement of the data for presentation to the indicating instrument.

The interface device is connected to the memory unit 70 of the smart sensor via the third communications link 51 and to the processor 80 of the indicating instrument via the second communications link 52. The interface device generally is mounted in or close to the indicating instrument.

The interface device 40 includes its own processor 120, and a memory unit 130 that is connected to the processor. The interface device interfaces with the smart sensor 20 and the indicating instrument 30 over the second and third communications links 51, 52 and automatically updates the calibration data. The memory unit 130 also may include a set of software instructions for communicating with the indicating instrument (for example to request the estimated temperature value or to send the calibration offset) and/or retrieving the characterizing data from the memory unit 70 of the smart sensor 20.

Generally it is expected that the interface device 40 would be preprogrammed for use with a particular smart sensor and a particular indicating instrument. For example, at the time of placing an order for a replacement sensor, the user could also order an smart interface device for use with a particular indicating instrument. However, it also is expected that the interface device could be reprogrammed by the user for use with a different smart sensor and/or a different indicating instrument.

Figure 3:
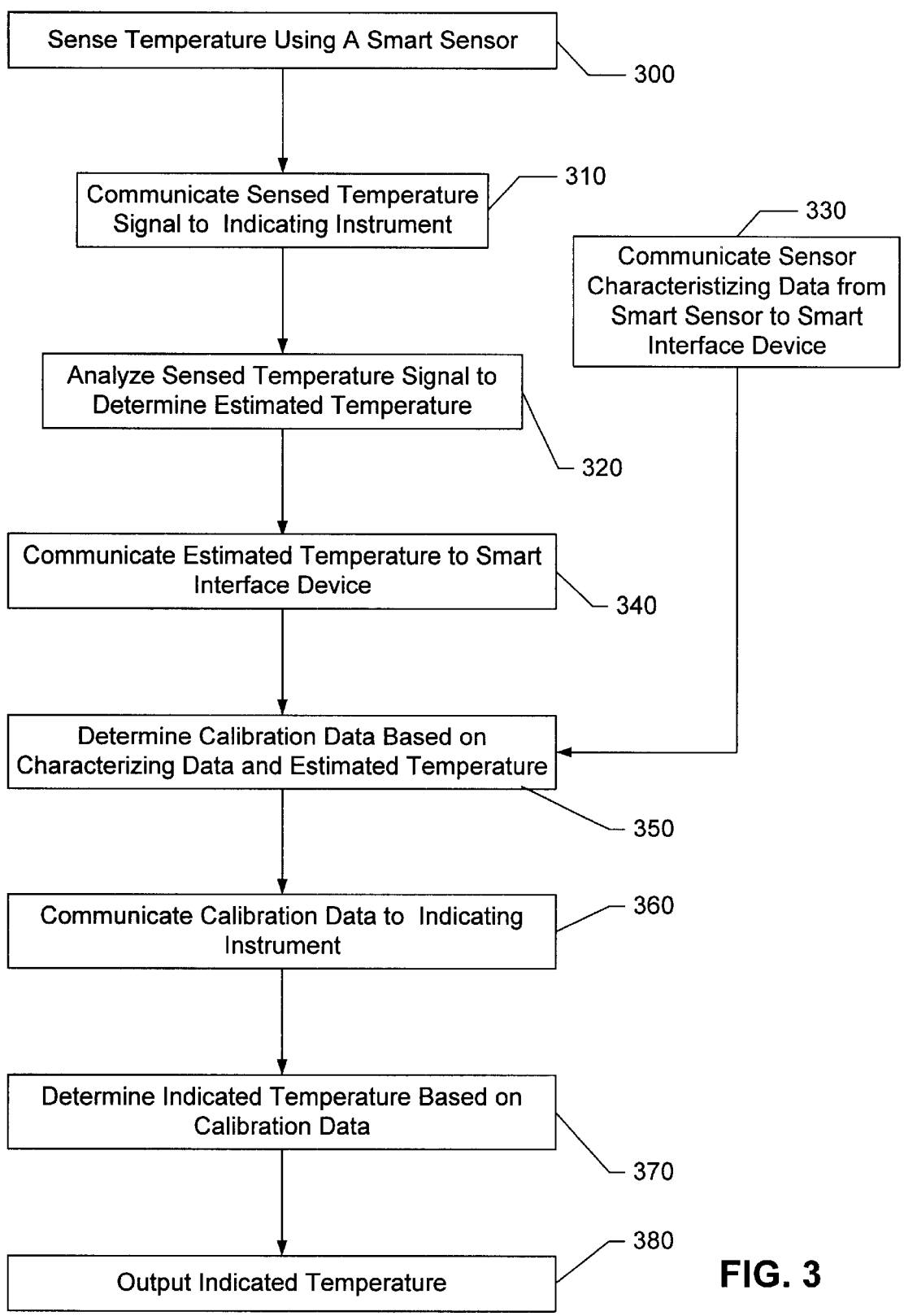
FIG. 3 is a flowchart illustrating a method in accordance with the present invention.

A method of practicing the present invention will be described with reference to FIG. 3. Beginning at step 300, the smart sensor 20 (FIG. 1) senses the temperature of an environment with which it is in contact. The sensor then provides a signal indicative of the sensed temperature to the indicating instrument 30 (FIG. 1) via the first communication link 50 (FIG. 1) at step 310. At step 320, the indicating instrument analyzes the sensed temperature signal and determines an estimated temperature. Meanwhile, at step 330 the characterizing data is communicated from the memory unit of the smart sensor to the interface device 40 via the third communication link 52. The estimated temperature is then communicated from the instrument to the smart interface device at step 340. Based on the characterizing data from the smart sensor and the estimated temperature from the indicating instrument, the smart interface device 40 automatically determines calibration data based on the characterizing data and the estimated temperature, at step 350. At step 360, the smart interface device 40 provides the calibration data to the indicating instrument 30. At steps 370 and 380, respectively, the indicating instrument 30 determines and outputs the indicated temperature based on the calibration data.

In particular, the processor of the indicating instrument 30 algebraically adds the calibration offset to the estimated temperature to determine the indicated temperature. The indicating instrument 30 then sends a signal representative of the indicated temperature to the display. The indicating instrument processor 80 can continuously or periodically monitor the sensed temperature signal and the calibration data to determine the indicated temperature and update the displayed temperature.

Because the indicating instrument 30 preferably requires no software or hardware modifications, the smart sensing system described herein can function in a broader range of applications. This includes systems where the instrument is already installed. It also includes systems where the sensor manufacturer and the instrument supplier are not the same. The system may also service those customers who find it economically advantageous to purchase stock components rather than custom designed components.

While the smart sensing features are available with no alteration of the standard indicating instrument, additional features may be made available with some slight modifications of the instrument's software. For instance if it is desired to know the manufacturing traceability of the sensor, a lot number could be stored in the sensor's memory unit for recall by the interface device and/or the indicating instrument. Since the instrument does not typically record this information, a software modification would be necessary in the instrument to access this piece of information. Such custom modifications can be made with minimal cost with the electronic architecture of most current instruments. In addition, although in the illustrated embodiment the calibration data includes an offset value or calibration offset, the calibration data might include characterizing data from the smart sensor reformatted as needed, and/or the estimated temperature adjusted by the offset value, i.e., the indicated temperature.

Furthermore, although the illustrated system is described as a temperature sensing system, the present invention includes systems capable of sensing other environmental properties, including pressure and relative humidity, for example.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment of the invention.

What is claimed is:

1. A programmable interface device for use with a smart sensor and an indicating instrument, comprising means for determining calibration data based on an estimated property value of a sensed environmental property and characterizing data that includes data characterizing the operation of the smart sensor, and means for communicating with the smart sensor and the indicating instrument, including means for communicating the calibration data to the indicating instrument and means for receiving the estimated property value.

2. A claim as set forth in claim 1, wherein the means for determining the calibration data includes a processor.

3. An interface device as set forth in claim 2, wherein the means for determining the calibration data includes a memory unit.

4. An interface device as set forth in claim 3, wherein the memory unit includes the calibration data, and the calibration data includes a calibration offset.

5. An interface device as set forth in claim 1, wherein the means for communicating includes a communications link.

6. An interface device as set forth in claim 5, wherein the communications link is a wire.

7. An interface device as set forth in claim 5, wherein the communications link includes means for connecting the communications link to a communications port.

8. A system for providing an indication of an environmental property, comprising:
    a smart sensor including a sensor unit operable to sense the environmental property and output a signal indicative of the sensed property, and a local memory unit having characterizing data including data characterizing the operation of the sensor unit;
    an indicating instrument connected to the smart sensor for receiving the signal indicative of the sensed property and for determining an estimated value of the sensed property from the signal indicative of the sensed property; and
    an inter-face device interconnected between the smart sensor and the indicating instrument for retrieving the characterizing data, and receiving the estimated value of the sensed property outputting the calibration data to the indicating instrument, the interface device having means for determining the calibration data based on the characterizing data and the estimated property value.

9. A system as set forth in claim 8, wherein the sensor unit is connected to the indicating instrument by a first communication link for communicating the signal indicative of the sensed property to the indicating instrument, the memory unit is connected to the interface device by a second communication link for communicating the characterizing data to the interface device, the indicating instrument is connected to the interface device by a third communications link for communicating to the interface device the estimated value of the sensed property, the communications links being connected to a communications port in the indicating instrument.

10. A system as set forth in claim 8, wherein the sensor unit is a temperature sensor.

11. A system as set forth in claim 10, wherein the temperature sensor is a resistance temperature device.

12. A system as set forth in claim 10, wherein the sensor unit is a thermocouple.

13. A system as set forth in claim 8, wherein the interface device includes a processor.

14. A system as set forth in claim 8, wherein the interface device includes a memory unit having software instructions for communicating with the smart sensor and the indicating instrument.

15. A system as set forth in claim 8, wherein the interface device includes a memory unit having software instructions for determining the calibration data.

16. A system as set forth in claim 15, wherein the memory unit is an electrically erasable programmable read-only memory.

17. A system as set forth in claim 8, wherein the means for determining the calibration data includes means for determining a calibration offset.

18. A system as set forth in claim 8, wherein the indicating instrument includes means for determining indicated property data.

19. A system as set forth in claim 18, wherein the indicating instrument includes a processor for determining the value of the sensed property based on the sensed property signal and for determining indicated property data based on the estimated property value and the calibration data.

20. A system as set forth in claim 19, wherein the indicating instrument processor is operable to determine the indicated property data by adding a calibration offset to the estimated property value.

21. A method for using an interface device with a smart sensor and an indicating instrument, comprising the steps of connecting the interface device between the smart sensor and the indicating instrument; transmitting a sensed property signal from the smart sensor to the indicating instrument: determining an estimated property value based on the sensed property signal; transmitting the estimated property value to the interface device; transmitting characterizing data to the interface device including data characterizing the operation of the smart sensor; determining calibration data from the estimated property value and the characterizing data; and determining an indicated property value based on the estimated property value and the calibration data.

22. A method as set forth in claim 21, wherein transmitting the sensed property data from the smart sensor includes transmitting sensed property data from a sensor unit of the smart sensor to the indicating instrument.

23. A method as set forth in claim 21, wherein determining the calibration data includes determining a calibration offset.

24. A method as set forth in claim 23, wherein determining the indicated property value includes algebraically adding the calibration offset to the estimated property value.

25. A method as set forth in claim 21, further comprising sensing an environmental property.

26. A method as set forth in claim 25, wherein sensing the environmental property includes sensing a temperature.

27. A method as set forth in claim 21, further comprising displaying the indicated property value.

28. A method as set forth in claim 21, wherein connecting the interface device between the smart sensor and the indicating instrument includes connecting a communications link from the indicating instrument to a communications port in the indicating instrument.

* * * * *